Patented July 28, 1942

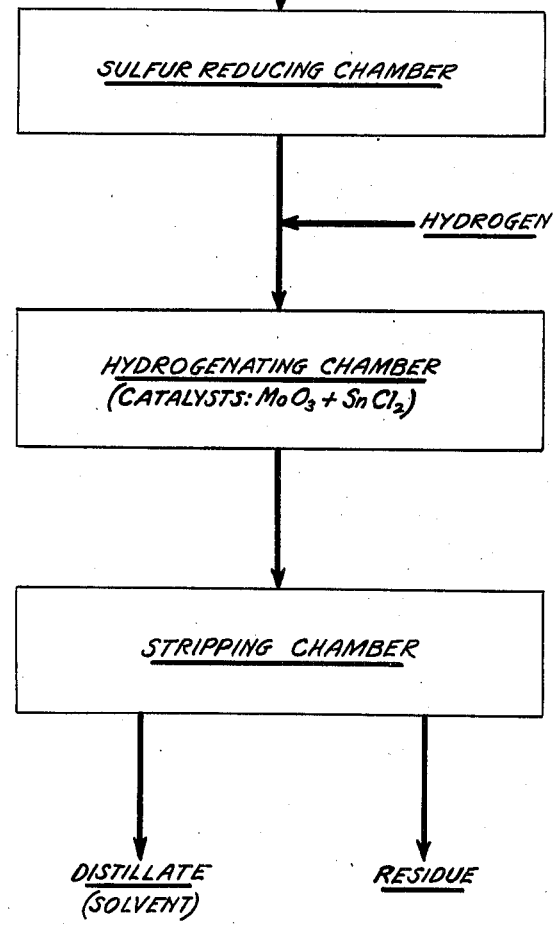

2,291,306

UNITED STATES PATENT OFFICE 2,291,306

PRODUCTION OF SOLVENTS

Jacquelin E. Harvey, Jr., Atlanta, Ga., assignor of one-half to Southern Wood Preserving Company, East Point, Ga., a corporation of Georgia Application August 14, 1940, Serial No. 352,668

1 Claim. (Cl. 196—53)

The present process relates to the production of valuable liquids from hydrocarbons, said hydrocarbons characterized by content of oxygenated compounds and sulphur.

An object of the invention is the production of refined solvents of lowered corrosivity from hydrocarbons of higher boiling range.

Another object of the present invention is the production of refined solvents of lowered corrosivity from liquid and solid hydrocarbons characterized by content of oxygenated compounds and sulphur.

A more specific object of the present invention is the conversion of tars of aromatic content and fractions thereof characterized by content of oxygenated compounds, molecular complexes and sulphur, substantially in entirety, if desired, of the material remaining liquid inder process conditions, into refined solvents of superior solvency and lowered corrosivity.

Other objects of the present invention will become apparent from the following disclosures.

The tars forming suitable starting materials for the present process are tars and their fractions derived from coal and petroleum, including gas or gases, and are characterized by content of aromatics, oxygenated compounds, and sulphur.

Coal tar and fractions thereof will be shown as a starting material of the example cited, but it will be immediately apparent that other tars or fractions thereof characterized by content of aromatics, oxygenated compounds and sulphur, serve as suitable starting materials.

Coal tar is a destructive distillate of coal generally having a predominance of fractions boiling above 190° C. and a typical specific gravity of 1.120. Said tar in its higher boiling range represents molecular complexes that may be viewed as a multiplicity of ring structures.

If desired, to the end that coal tar, or fractions thereof, in the substantial entirety thereof remaining finally liquid under process conditions, be converted into refined solvents of lowered corrosivity of the present process, said molecular complexes may be progressively or step-wise reduced in size, and, among other things, the present invention is predicated on such teaching.

As far as applicant understands the theory of the present invention, same is predicated on the following:

First: by depolymerizing the molecular complexes in step-wise manner, they are finally brought down to the refined solvents of lowered corrosivity of the present invention.

Second: that by impressing reaction conditions on said molecular complexes, they are converted into solvents whose solvency is directly measureable and/or usable as opposed to the absence of such characteristics in the molecular complexes contained in the starting material, and, Third: to conform to the present invention, said molecular complexes must be depolymerized under conditions that induce no substantial percentage of normally liquid products that are other than aromatic. By the term "substantial aromaticity" as used herein and in the appended claims is meant that the solvents of the present invention are at least in the order of 50% aromatic.

Viewed broadly, the present invention provides a process wherein among other things, coal tar or the like, or fractions thereof, characterized by content of oxygenated compounds, molecular complexes and sulphur content, is subjected to the action of hydrogen to lower sulfur the while inducing no substantial percentage of solvent, afterwards to the action of hydrogen while contacting an oxide catalyst and a catalyst material selected from the group consisting of halogens, halids, and derivatives thereof, including substitution and addition products thereof, under controlled conditions whereby the high molecular complexes of the starting material may be reduced in step-wise manner to provide refined solvents of lowered corrosivity that are characterized by lowered and controlled boiling range and directly measurable and/or usable solvency as opposed to the absence of similar characteristics in said molecular complexes contained in the starting material.

By providing the presence of a catalytic material adapted to influence the decomposition of oxygenated compounds contained in the starting material, the induction of solvency is enhanced. Included among those catalytic materials adapted to influence the decomposition of oxygenated compounds contained in the starting material, are halids, halogens and derivatives thereof, including substitution and addition products thereof.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

*Example.*—Coal tar, specific gravity 1.120 and 3% distilling at 210° C. and characterized by content of sulphur, molecular complexes and oxygenated compounds is treated with hydrogen at 350° C. and 200 atmospheres pressure to lower sulphur content thereby lowering corrosivity, at least providing for lowered corrosivity in a final product. The coal tar of reduced sulphur content is passed through a high pressure reaction vessel at a temperature of 405° C. and a pressure of 300 atmospheres. Flow of hydrogen is 15,000 cubic feet per barrel tar. The time of contact is one hour and the catalyst molybdenum oxide and tin chloride. The beneficated coal tar flowing from the reactor is distilled to an upper limit of 210° C. to recover the refined solvent of lowered corrosivity as a distillate. The residue resulting from said solvent recovery is of a more liquid nature than a comparable cut on the starting material, indicating that the high boiling ends formerly described as including multiplicity of rings or molecular complexes had either been saturated or partially saturated, thus providing the initial step in the step-wise conversion of substantial entirety of the tar remaining finally liquid under process conditions into the refined solvent of lowered corrosivity of the present invention. It will be found that no percentage of liquid chain structures had been induced that would preclude production of solvents having an aromaticity of at least substantially 50%, and that no substantial percentage of carbonaceous deposition was formed in the reaction chamber.

The residue resulting from refined solvent recovery may be recycled for conversion to the refined solvent of the present invention or used as an article of commerce.

Thus, under the action of hydrogen while contacting an oxide catalyst and a catalytic material selected from the group consisting of halogens, halids and derivatives thereof including substitution and addition products thereof, the starting material under temperature and pressure conditions chosen from in excess of 250° C. and atmospheric, respectively, is converted to refined solvents of lowered corrosivity boiling, as an example, below 210° C., said refined solvents being characterized by at least 50% aromatic content, and being further characterized by being products produced while step-wise reduction of a multiplicity of rings is being effected; said solvents are also further characterized by being those products flowing from ring reduction, including in size, said reduction being effected under coordinated time, temperature and pressure conditions that preclude substantial deposition, as for instance, 25%. Carbonaceous deposition referring to any time or period of the process wherein controls are impressed for multiplicity of ring reduction for final formation of the refined solvent of lowered corrosivity of the present invention.

After formation of the refined solvent of lowered corrosivity and the removal thereof from the parent and beneficiated material, said refined solvent may be fractionally cut as desired, or the cut or cuts may be effected at the time of recovery from the parent material.

Viewed broadly, the present invention provides a process for subjecting tars and fractions thereof boiling substantially above 190° C. and characterized by content of oxygenated compounds and sulphur, and derived from coal, petroleum or gas, to the action of hydrogen, as heretofore explained, one or more times, so controlled as to induce solvency of usable and/or measurable quality as opposed to the absence of such characteristic in the ring multiples contained in the starting material.

The present invention may be practiced in a discontinuous manner, or in a continuous manner in a high pressure reaction chamber, a series of reaction chambers, a parallelism of reaction chambers, including a multiplicity thereof.

By the term "beneficiated" as used herein and in the appended claim is meant the starting material at least once subjected to the action of hydrogen in accordance with the present process.

By the term "depolymerization" is also meant the action of hydrogen on hydrocarbons containing a plurality of rings whereby to effect reduction, including in size, thus providing among other things, the refined solvents of lowered corrosivity and superior solvency of the present invention.

Solvents of the present invention are not circumscribed by any definite boiling range but are rather characterized by at least 50% aromaticity as heretofore described, and the solvents so produced may serve as substitutes for the boiling range or ranges of benzene, toluene, xylene and the various naphthas and plasticizers. Heavy naphthas proposed as solvents are currently available having an end point in the order of 360° C. The present invention provides for cutting the solvent from the parent material at any point desired with subsequent fractionation into desired cuts as may be dictated by commercial necessity; residue may be recycled as aforetaught.

The phase condition of the present process is liquid phase and is not that phase that gasifies all starting material. The term "liquid phase" as used herein and in the appended claim may not be technically correct, but is meant to differentiate from processes that gasify all materials processed.

The starting materials of the present process are not circumscribed by limitation in carbon content, being merely limited by the nature of tars and fractions thereof available as the starting material. Tars of more than usual carbon content may be depolymerized under less severe conditions at first with severer conditions progressively applied until maximum reaction conditions are attained.

Many modes of practicing the present invention are possible. For instance, tar may be stripped of any percentage of low boiling ends and the residual mass then treated in accordance with the process to provide the refined solvent of lowered corrosivity of the present invention.

Thus, pitches hard or soft are among the starting materials of the present process; also included in the starting materials are those residual portions of tar, more viscous than the parent material, resulting from removal of low boiling ends therefrom. Viewed broadly, the starting materials of the present process are tars of aromatic content and fractions thereof, characterized by content of oxygenated compounds, sulphur and a preponderance of fractions boiling above 190° C.

Aromatic tars characterized by content of oxygenated compounds and sulphur content produced by the petroleum industry are usable and desirable starting materials.

Those skilled in the art know that hydrogenations proceed at lowered pressures, however commercial recoveries of the refined solvent of the present process are best effected at elevated pressures; thus the present invention includes use of pressures as high as practicable. The time element of treatment in the first cycle of hydrogen action is that period necessary for reduction of sulphur content the while precluding substantial solvent production, while in the second cycle of hydrogen action, treatment may be as short as one hour, or more, or less, predicated, of course, on maintaining reaction conditions that are not prejudicial to depolymerization.

The starting materials of the present process include tars of aromatic content or fractions thereof characterized by content of oxygenated compounds and sulphur, at least once refined by hydrogen, or other means.

The solvent of the present invention is varied in boiling range and includes the ranges of any or all of the following:

| Product: | Boiling range °C. |
|---|---|
| Benzol | 78–120 |
| Toluol | 100–150 |
| Hi-flash naphtha | 150–200 |
| High boiling crudes | 175–360 |
| Heavy naphtha | 150–290 |
| Plasticizers | 150–360 |

Instead of controlling the process to provide a low boiling point of 78° C., as for instance in the benzol shown, processing may be controlled to produce lower boiling products. Controls of lesser intensity produce solvents of higher initial point, while controls of greater intensity produce solvents of lower boiling point.

The solvent of the present process may be characterized by containing fractions boiling at least 150° to 200° C.

Broadly considered, the present process provides a method for converting tars of aromatic content and fractions thereof including creosote, topped tars, stripped tars and various pitches characterized by sulphur content and molecular complexes, to refined solvents of lowered corrosity by the controlled action of hydrogen under conditions that induce no substantial percentage of liquid chain structures or carbon deposits as heretofore explained.

The catalysts of the present invention are oxides and a catalytic material selected from the group consisting of halogens, halids, and derivatives including substitution and addition products thereof; oxides of metals of the 6th and 8th periodic groups are usable, however other oxide catalysts may be used. Difficultly reducible oxides are preferred.

In the first cycle of hydrogen action that reduces sulphur content, said reduction of sulphur may be accomplished in the presence of a catalyst. Catalysts effective in the presence of hydrogen are usable, as for instance, the oxides and/or sulfides of molybdenum, vanadium, uranium, cobalt, tin, manganese, tungsten, or the like.

In the disclosures herein made the removing of low boiling fractions by gas movement or pressure release is considered the equivalent of distillation.

When reference is made to high molecular complexes contained in the starting material, and when the starting material contains low boiling fractions that are not considered high molecular complexes, it is of course obvious that the high molecular complexes contained in the starting material are to a certain extent depolymerized by the solvent present; in other words, if high boiling fractions of tar including pitches characterized by content of molecular complexes are used as the starting material, said molecular complexes prior to being subjected to process variables may first be depolymerized with a suitable solvent.

It will be seen that by reduction of sulfur content of the material under treatment during any stage of hydrogen action, the oxide catalyst used during subsequent stages is at least partially protected from the effect of the sulfur.

Minor changes may be made in the foregoing without departing from the spirit of the invention.

I claim:

In the production of solvents from a mixture of high temperature coal tar fractions, the process which comprises: subjecting said mixture of tar fractions to the action of hydrogen with the time, temperature and pressure conditions so adjusted as to lower the sulfur content of said tar fractions; thereafter subjecting said tar fractions of lowered sulfur content to the action of a flow of hydrogen of about 15,000 cubic feet per barrel material treated, in the presence of as catalyst materials molybdenum oxide and tin chloride at a pressure of about 300 atmospheres and with the temperature and time of reaction so adjusted as to reduce molecular complexes whilst inducing newly formed low boiling fractions preponderantly of aromatic nature; and stripping the treated material to provide newly formed low boiling fractions as solvent material.

JACQUELIN E. HARVEY, JR.